(12) United States Patent
Doddaiah et al.

(10) Patent No.: US 11,782,798 B2
(45) Date of Patent: Oct. 10, 2023

(54) METHOD AND APPARATUS FOR PREDICTING AND EXPLOITING APERIODIC BACKUP TIME WINDOWS ON A STORAGE SYSTEM

(71) Applicant: Dell Products, L.P., Hopkinton, MA (US)

(72) Inventors: Ramesh Doddaiah, Westborough, MA (US); Malak Alshawabkeh, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 127 days.

(21) Appl. No.: 17/669,459

(22) Filed: Feb. 11, 2022

(65) Prior Publication Data

US 2023/0259429 A1    Aug. 17, 2023

(51) Int. Cl.
| | |
|---|---|
| *G06F 11/14* | (2006.01) |
| *G06F 11/30* | (2006.01) |
| *G06F 11/32* | (2006.01) |
| *G06F 11/07* | (2006.01) |
| *G06F 18/214* | (2023.01) |

(52) U.S. Cl.
CPC ........ *G06F 11/1464* (2013.01); *G06F 11/076* (2013.01); *G06F 11/1451* (2013.01); *G06F 11/1469* (2013.01); *G06F 11/3024* (2013.01); *G06F 11/328* (2013.01); *G06F 18/214* (2023.01)

(58) Field of Classification Search
CPC .... G06F 11/14; G06F 11/1464; G06F 11/076; G06F 11/1451; G06F 11/1469
See application file for complete search history.

(56) References Cited

U.S. PATENT DOCUMENTS

| | | | |
|---|---|---|---|
| 2012/0158805 A1* | 6/2012 | Andre | G06F 16/24552 707/827 |
| 2013/0046721 A1* | 2/2013 | Jiang | G06N 7/01 706/47 |
| 2013/0318022 A1* | 11/2013 | Yadav | G06Q 10/00 706/46 |
| 2020/0067969 A1* | 2/2020 | Abbaszadeh | G06N 20/10 |
| 2020/0341794 A1* | 10/2020 | Martin | H04L 41/0895 |
| 2021/0034494 A1* | 2/2021 | Vishwakarma | G06F 3/0689 |
| 2021/0365350 A1* | 11/2021 | Fujita | G06F 9/5027 |
| 2022/0004897 A1* | 1/2022 | Jadon | G06N 3/084 |
| 2023/0014795 A1* | 1/2023 | Khan | H04L 41/147 |

* cited by examiner

Primary Examiner — Kamini B Patel
(74) Attorney, Agent, or Firm — Anderson Gorecki LLP

(57) ABSTRACT

A multivariate time series model such as a Vector Auto Regression (VAR) model is built using fabric utilization, disk utilization, and CPU utilization time series data. The VAR model leverages interdependencies between multiple time-dependent variables to predict the start and length of an aperiodic backup time window, and to cause backup operations to occur during the aperiodic backup time window to thereby exploit the aperiodic backup time window for use in connection with backup operations. By automatically starting backup operations during predicted aperiodic backup time windows where the CPU, disk, and fabric utilization values are predicted to be low, it is possible to implement backup operations during time windows where the backup operations are less likely to interfere with primary application workloads, or system application workloads that need to be implemented to maintain optimal operation of the storage system.

17 Claims, 12 Drawing Sheets

FIG. 3

| Time Step 305 | Fabric Utilization (X-B/Sec) 310 | Disk Utilization (X-B/Sec) 315 | CPU Utilization (X-Hz) 320 |
|---|---|---|---|
| 0 | 10 | 30 | 5 |
| 1 | 10 | 30 | 5 |
| 2 | 100 | 1000 | 2000 |
| ... | ... | ... | ... |
| 285 | 900 | 2990 | 5000 |
| 286 | 1000 | 3000 | 800 |
| 287 | 900 | 2990 | 800 |

Storage System Resource Utilization Data Structure 300

FIG. 4

Normalized Storage System Resource Utilization Data Structure 400

| Time Step 400 | Fabric Utilization (%) 405 | Disk Utilization (%) 410 | CPU Utilization (%) 415 |
|---|---|---|---|
| 0 | 0.01 | 0.01 | 0.01 |
| 1 | 0.01 | 0.01 | 0.01 |
| 2 | 0.10 | 0.33 | 0.40 |
| ... | ... | ... | ... |
| 285 | 0.90 | 0.99 | 1.00 |
| 286 | 1.00 | 1.00 | 0.16 |
| 287 | 0.90 | 0.99 | 0.16 |
| ... | ... | ... | ... |

Vector Auto Regression Model (order p=1)

$Fabric(t) = a1 + w11*Fabric(t-1) + w12*Disk(t-1) + w13*CPU(t-1) + e1(t-1)$
$Disk(t) = a2 + w21*Fabric(t-1) + w22*Disk(t-1) + w23*CPU(t-1) + e2(t-1)$
$CPU(t) = a3 + w31*Fabric(t-1) + w32*Disk(t-1) + w33*CPU(t-1) + e3(t-1)$

Vector Auto Regression Model (order p=n)

$Fabric(t) = a1 + w11_1*Fabric(t-1) + w12_1*Disk(t-1) + w13_1*CPU(t-1) + e1_1(t-1)$
$+ w11_2*Fabric(t-2) + w12_2*Disk(t-2) + w13_2*CPU(t-2) + e1_2(t-2)$ $\cdots$ $+ w11_n*Fabric(t-n) + w12_n*Disk(t-n) + w13_n*CPU(t-n) + e1_n(t-n)$ $Disk(t) = a2 + w21_1*Fabric(t-1) + w22_1*Disk(t-1) + w23_1*CPU(t-1) + e2_1(t-1)$
$+ w21_2*Fabric(t-2) + w22_2*Disk(t-2) + w23_2*CPU(t-2) + e2_2(t-2)$ $\cdots$ $+ w21_n*Fabric(t-n) + w22_n*Disk(t-n) + w23_n*CPU(t-n) + e2_n(t-n)$ $CPU(t) = a3 + w31_1*Fabric(t-1) + w32_1*Disk(t-1) + w33_1*CPU(t-1) + e3_1(t-1)$
$+ w31_2*Fabric(t-2) + w32_2*Disk(t-2) + w33_2*CPU(t-2) + e3_2(t-2)$ $\cdots$ $+ w31_n*Fabric(t-n) + w32_n*Disk(t-n) + w33_n*CPU(t-n) + e3_n(t-n)$

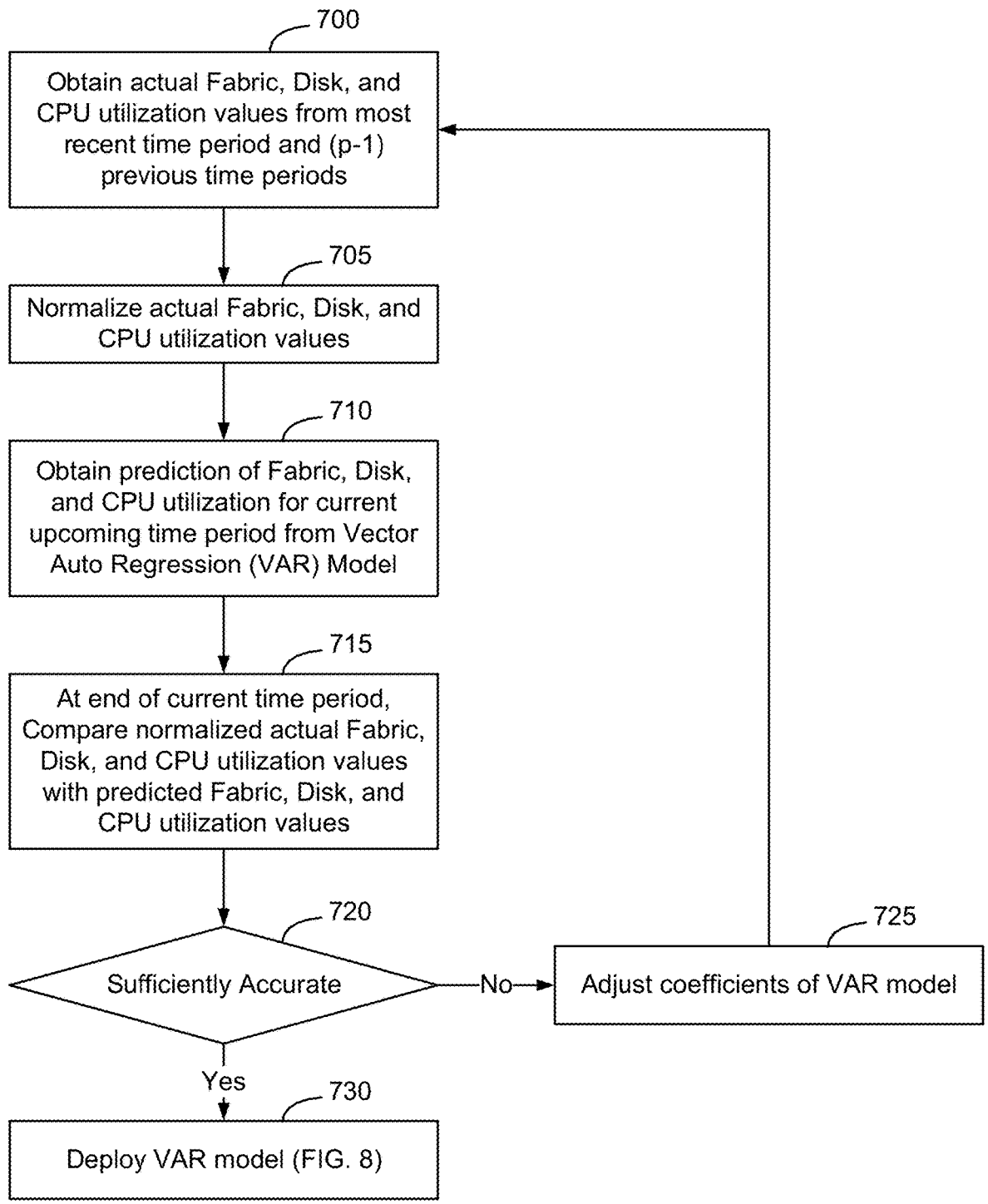

Deploy and monitor

Estimate Length of Backup Time Window

FIG. 10

Predicting length of aperiodic backup time window using VAR Model (order p=3)

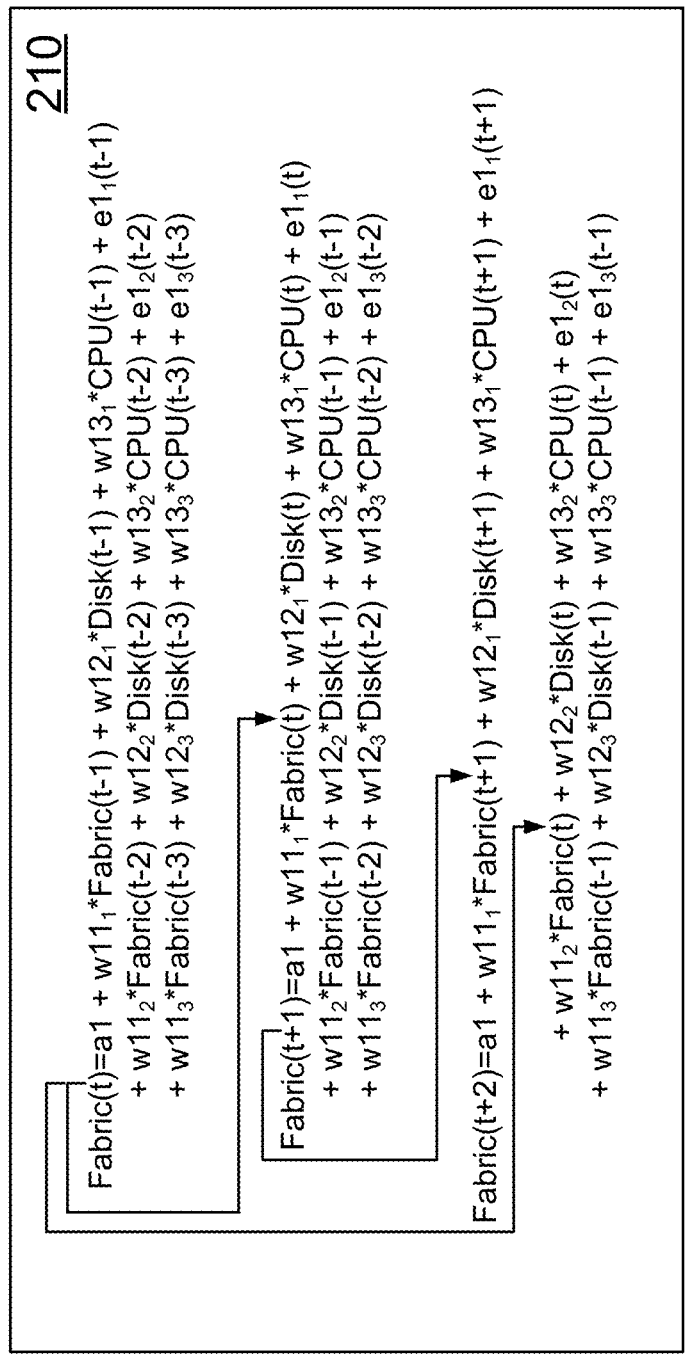

$$Fabric(t) = a1 + w11_1*Fabric(t-1) + w12_1*Disk(t-1) + w13_1*CPU(t-1) + e1_1(t-1)$$
$$+ w11_2*Fabric(t-2) + w12_2*Disk(t-2) + w13_2*CPU(t-2) + e1_2(t-2)$$
$$+ w11_3*Fabric(t-3) + w12_3*Disk(t-3) + w13_3*CPU(t-3) + e1_3(t-3)$$

$$Fabric(t+1) = a1 + w11_1*Fabric(t) + w12_1*Disk(t) + w13_1*CPU(t) + e1_1(t)$$
$$+ w11_2*Fabric(t-1) + w12_2*Disk(t-1) + w13_2*CPU(t-1) + e1_2(t-1)$$
$$+ w11_3*Fabric(t-2) + w12_3*Disk(t-2) + w13_3*CPU(t-2) + e1_3(t-2)$$

$$Fabric(t+2) = a1 + w11_1*Fabric(t+1) + w12_1*Disk(t+1) + w13_1*CPU(t+1) + e1_1(t+1)$$
$$+ w11_2*Fabric(t) + w12_2*Disk(t) + w13_2*CPU(t) + e1_2(t)$$
$$+ w11_3*Fabric(t-1) + w12_3*Disk(t-1) + w13_3*CPU(t-1) + e1_3(t-1)$$

210

Evaluate Accuracy of VAR predictions

METHOD AND APPARATUS FOR PREDICTING AND EXPLOITING APERIODIC BACKUP TIME WINDOWS ON A STORAGE SYSTEM

FIELD

This disclosure relates to computing systems and related devices and methods, and, more particularly, to a method and apparatus for predicting and exploiting aperiodic backup time windows on a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a multivariate time series model is built that leverages interdependencies between multiple time-dependent variables to predict the start and length of an aperiodic backup time window, and to cause backup operations to occur during the aperiodic backup time window, to thereby exploit the aperiodic backup time window for use in connection with backup operations. In some embodiments, the multivariate time series model is a Vector Auto Regression (VAR) model that is built using fabric utilization, disk utilization, and CPU utilization time series data. Once trained, the VAR model is deployed and used to predict occurrence of aperiodic backup time windows. The accuracy of the VAR model is monitored and the VAR model is retrained, as necessary, when the accuracy of the VAR model is determined to be insufficient. By automatically starting backup operations during predicted aperiodic backup time windows where the fabric, disk, and CPU utilization values are predicted to be low, it is possible to implement backup operations during time windows where the backup operations are less likely to interfere with primary application workloads, and storage system background workloads that need to be implemented to maintain optimal operation of the storage system.

BRIEF DESCRIPTION OF THE DRAWINGS

FIG. 3 is a functional block diagram of an example storage system resource utilization data structure, according to some embodiments.

FIG. 4 is a functional block diagram of an example normalized storage system resource utilization data structure, according to some embodiments.

FIG. 5 is a functional block diagram of an example Vector Auto Regression (VAR) model (order p=1), according to some embodiments.

FIG. 6 is a functional block diagram of an example Vector Auto Regression (VAR) model (order p=n), according to some embodiments.

FIG. 7 is a flow chart of a process of training a VAR model using multivariate time-series data, according to some embodiments.

FIG. 10 is a functional block diagram showing use of a VAR model in an iterative manner to predict utilization values of multiple upcoming subsequent time periods, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
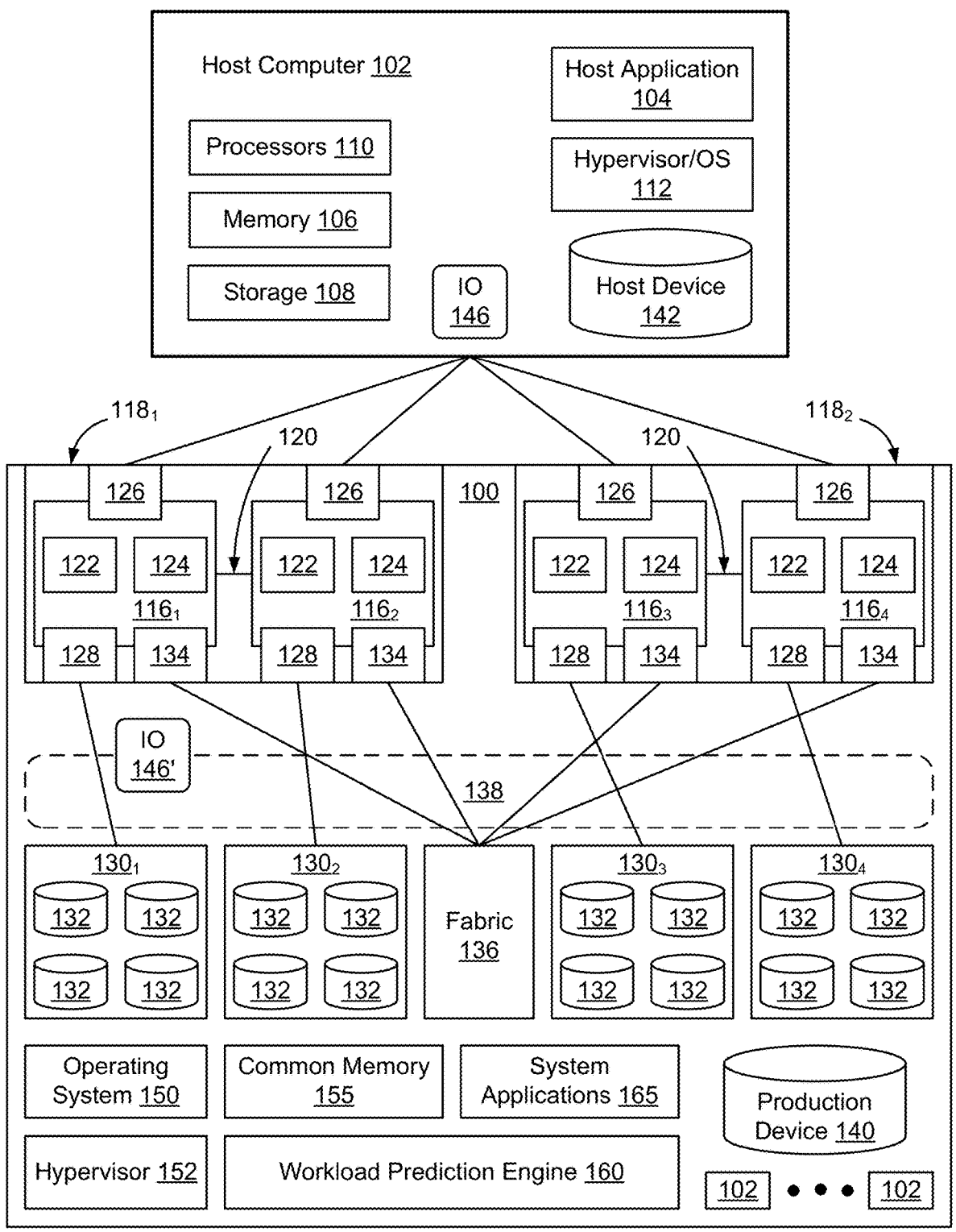
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the production device 140.

Storage systems have one or more systems applications 165 that are used to optimize configuration of the storage system or optimize configuration of the data that is stored on the storage system, to enable the storage system to meet its service level objectives. Example systems applications 165, for example, might be applications configured to move data that is more frequently accessed into faster regions of memory, to uncompress more frequently accessed data and keep the data in uncompressed form on managed storage resources 132 or in shared global memory 138, cache management processes, and other similar applications. The workloads associated with these systems applications 165 often is implemented as background applications that are not visible to the host, but are vital to enabling the storage system to continue meeting its service level objectives.

Many customers such as host computer 102 run storage backup operations periodically, such as during the weekends at 6 p.m. Typically, backup operations create a high workload by utilizing most of the CPU cycles in the storage system and consuming all the fabric and disk bandwidth. Customers often decide when to run backup operations heuristically, expecting business critical workloads to be low on particular days and at particular times of the day, and hence often schedule the backup operations to run, for example, during the evening hours or on weekends.

Unfortunately, when making a decision to start a backup operation, the customer might not have visibility to the systems applications 165 that are also running on the storage system. For example, the customer might not have visibility as to how much of the storage system resources are being consumed by internal background tasks such as compression, deduplication, red-hot data movement etc. When a customer decides to start a backup operation at the same time that the storage system is executing one or more of the systems applications 165, initiating backup operations by the customer can cause the storage system to exhibit high response times for host application 104 workload. In a situation where the host application 104 is considered mission critical, it would be advantageous to be able to avoid having the storage system response time impeded by preventing storage system backup operations from occurring at the same time that the storage system is expending considerable resources in connection with executing systems application 165.

According to some embodiments, a multivariate time series model is built that leverages interdependencies between multiple time-dependent variables to predict the start and length of an aperiodic backup time window, and to cause backup operations to occur during the aperiodic backup time window to thereby exploit the aperiodic backup time window for use in connection with backup operations. In some embodiments, the multivariate time series model is a Vector Auto Regression (VAR) model that is built using fabric utilization, disk utilization, and CPU utilization time series data. Once trained, the VAR model is deployed and used to predict occurrence of aperiodic backup time windows. The accuracy of the VAR model is monitored and the VAR model is retrained, as necessary, when the accuracy of the VAR model is determined to be insufficient. By automatically starting backup operations during predicted aperiodic backup time windows where the fabric, disk, and CPU utilization values are predicted to be low, it is possible to implement backup operations during time windows where the backup operations are less likely to interfere with primary application workloads, or storage system background workloads that need to be implemented to maintain optimal operation of the storage system.

Figure 2:
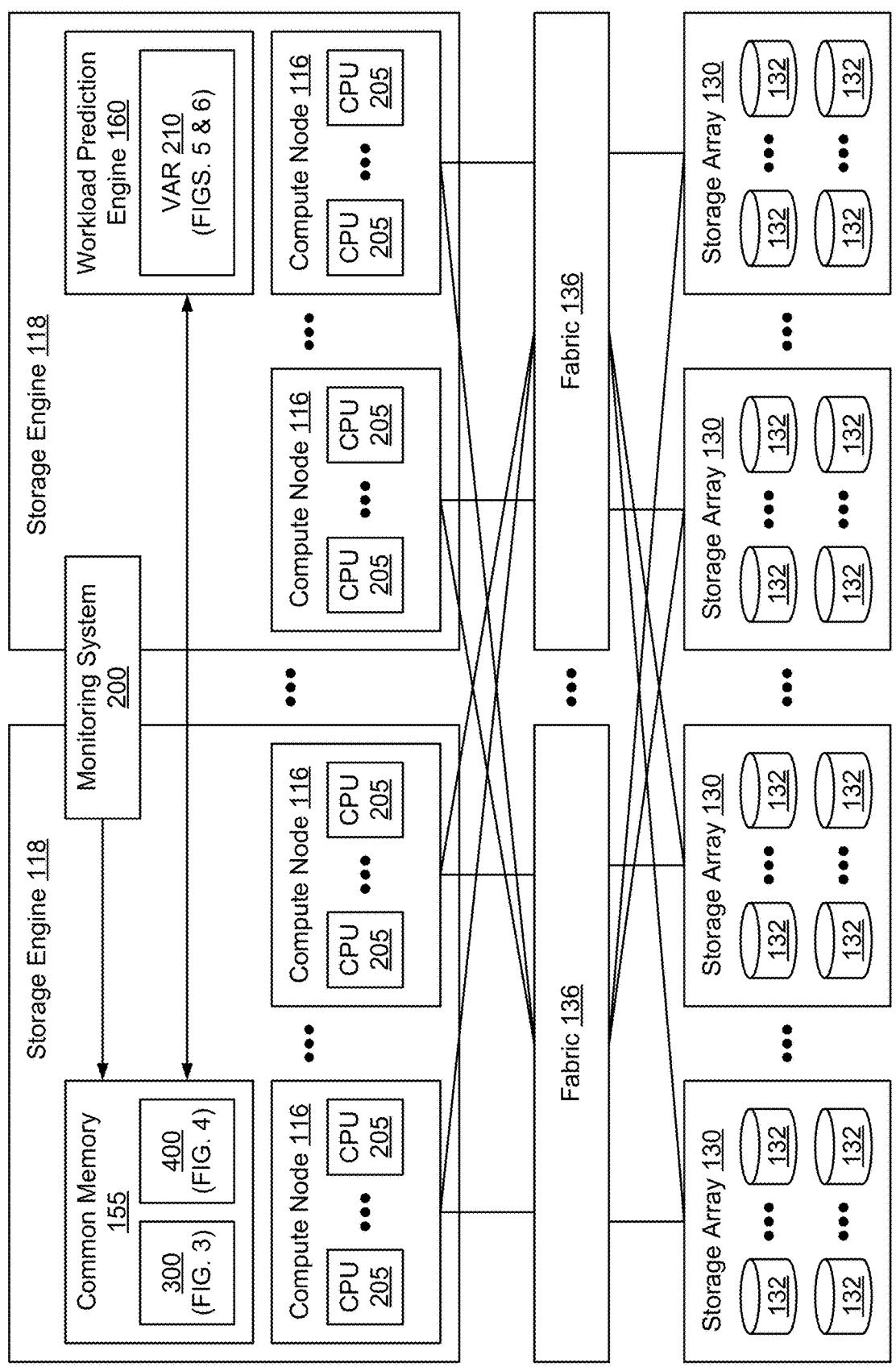
FIG. 2 is a functional block diagram of an example storage system including a workload prediction engine configured to predict and exploit aperiodic backup time windows, according to some embodiments.

FIG. 2 is a functional block diagram of an example system including a workload prediction engine 160 configured to predict and exploit aperiodic backup time windows, according to some embodiments. As shown in FIG. 2, in some embodiments a monitoring system 200 is deployed on the storage system 100 to collect resource utilization information across all storage engines 118 of the storage system 100. System applications 165 can consume resources of particular storage engines 118 or can consume resources of multiple storage engines 118 within the storage system 100. In some embodiments, the monitoring system 200 captures metrics about resource utilization of each processing board within the storage system, and aggregates the metrics to common memory 155 where the metrics are used to populate one or more data structures 300, 400. Example data structures are discussed in greater detail in connection with FIGS. 3 and 4.

In some embodiments, the monitoring system 200 is used to monitor CPU 205 utilization of all CPUs within storage system 100, fabric 136 utilization across all fabrics 136 within the storage system 100, and disk 132 utilization across all disks 132 of all storage arrays 130. Some workloads can cause high fabric utilization without causing high disk utilization, or can cause high CPU utilization without causing high disk or fabric utilization. Likewise, it is possible for a particular type of workload to have a low CPU utilization but a high fabric and disk utilization. By monitoring CPU utilization, fabric utilization, and disk utilization, and building a time series of these resource utilization values over time, it is possible for a workload prediction engine 160 to build a multivariate time series model such as a Vector Auto Regression (VAR) model 210 that leverages interdependencies between these multiple time-dependent variables.

In some embodiments, based on historical time-series analysis of fabric utilization, disk utilization, and CPU utilization, it is possible to identify trends and seasonality to recommend an optimal aperiodic backup time window when the storage system internal workloads associated with systems applications 155 and external workloads associated with host workloads are low. These aperiodic backup time windows, in some embodiments, are exploited by starting backup operations during the non-peak time windows, which enables the backup operations to be implemented, while reducing the likelihood that the backup operations will interfere with the responsiveness of the storage system to application workloads.

In some embodiments, the monitoring system 200 captures the fabric bandwidth per board, the disk bandwidth per board, and the CPU utilization across each thread within an emulation and across all emulations per board. The goal is to forecast these variables to find a time window when all three utilization rates are lower than given customer threshold. In some embodiments, the given customer threshold is a hyper parameter that is able to be set by the customer, to tune operation of the storage system based on customer preferences and operational characteristics of the storage system itself.

The monitoring system 200 can be an independent process executing on the storage system, may be implemented as part of an existing process on a storage system performance monitoring system, or may be implemented as part of the workload prediction engine 160. Regardless of how the monitoring system 200 is implemented, in some embodiments, monitoring system 200 collects the fabric utilization, disk utilization, and CPU utilization, and stores these utilization values in a storage system resource utilization data structure 300 in common memory 155.

FIG. 3 is a functional block diagram of an example storage system resource utilization data structure 200, according to some embodiments. As shown in FIG. 3, in some embodiments, the monitoring system aggregates resource utilization in time intervals 305 and, for each time interval, creates an entry in storage system resource utilization data structure 300. Example time intervals might be on the order of 5 minutes or another interval sufficient to characterize performance of the storage system over time, and to characterize the temporal dependencies between fabric utilization, disk utilization, and CPU utilization. Although an example will be provided in which the time interval is five minutes, it should be understood that other intervals such as 2.5 minutes, 10 minutes, etc., might be used depending on the implementation.

During each time interval, the monitoring system aggregates data and generates a mean (average) fabric utilization value 310, disk utilization value 315, and CPU utilization value 320. Although an implementation will be described in which the monitoring system 200 reports the mean (average) utilization values, it should be understood that other ways of characterizing these utilization values over the time interval might be used as well. For example, in some embodiments the monitoring system might report the middle value (median), or the most likely value (mode) of the utilization during the time interval. Thus, the particular statistical mechanism used to describe the utilization values during the interval might change depending on the implementation.

In some embodiments, when the monitoring system 200 generates utilization values and creates entries in storage system resource utilization data structure 300, the entries such as fabric utilization 310, disk utilization 315, and CPU utilization 320, are associated with particular units. For example, as shown in FIG. 3, in some embodiments the fabric utilization values reported by the monitoring system may be reported in MB/Sec, GB/Sec, TB/Sec, etc. which are shown in FIG. 3 as "X-B/Sec". Likewise, the disk utilization values reported by the monitoring system may be reported in MB/Sec, GB/Sec, TB/Sec, etc. which are shown in FIG. 3 as "X-B/Sec". CPU utilization is frequently characterized in MHz, GHz, etc. Accordingly, as shown in FIG. 3, in some embodiments the CPU utilization values reported by the monitoring system may be reported in MHz, GHz, etc. which are shown in FIG. 3 as "X-Hz". Other units of measurement may be utilized depending on the implementation.

Although FIG. 3 shows the storage system resource utilization data structure 300 implemented in the form of a table for ease of illustration, it should be understood that other data structures could be used to implement the storage system resource utilization data structure 300, depending on the implementation.

In some embodiments, utilization values entered in the storage system resource utilization data structure 300 are normalized or standardized, by transforming the data to fall within a smaller or common range such as [0.0, 1.0]. FIG. 4 is a functional block diagram of an example normalized storage system resource utilization data structure 400, according to some embodiments. In some embodiments, the data from the storage system resource utilization data structure is normalized using a min-max normalization process, which performs a linear transformation on the original data to determine corresponding entries in the normalized storage system resource utilization data structure 400. One way of implementing a min-max normalization process may be implemented using the following equation 1:

$$X\text{normalized} = (X - X\text{minimum})/(X\text{maximum} - X\text{minimum}) \quad \text{Equation 1:}$$

in which Xnormalized is the value entered into the normalized storage system resource utilization data structure 400, X is the value of the corresponding entry from the storage system resource utilization data structure 300, and Xmaximum and Xminimum are the maximum and minimum values for the corresponding utilization value that appear in the storage system resource utilization data structure 300. For example, if the maximum and minimum fabric utilization values are 1000 units and 100 units, respectively, and an entry has a fabric utilization value of 900 units, then the normalized value for that entry may be calculated as x=(900−100)/(1000−100)=800/900=0.888.

Other ways of normalizing values from the storage system resource utilization data structure 300 may be used as well, depending on the implementation. It should be noted that the normalized values contained in the normalized storage system resource utilization data structure 400 are unit-less, in that the normalization process enables the values to be converted into values that reside within a common range and are without units. In some embodiments, the range (e.g. [0.0, 1.0]) is the same for fabric utilization, disk utilization, and CPU utilization. In other embodiments, different ranges may be used for different utilization variables. Likewise, the selected range of [0.0, 1.0] is merely one example range, as other implementations may use other ranges, e.g. [0.0-10.0], [0.0-100.0], etc.

A multivariate time series data consists of multiple time-dependent variables, and is generally used to model and explain the interesting interdependencies and associations among the variables. In a multivariate analysis, an assumption is that the time-dependent variables not only depend on their past values, but also show dependency between them. Multivariate time series models leverage these interdependencies between the time-dependent variables, to provide more reliable and accurate forecasts of future values of the time-dependent variables based on a recent set of values of the time-dependent variables. According to some embodiments, a multivariate time series model is trained to learn the interdependencies between fabric utilization, disk utilization and CPU utilization of a storage system. In some embodiments, this multivariate time series model is implemented as a Vector Auto Regression (VAR) model, that is trained to learn the interdependencies between these time-dependent variables. Although some embodiments will be described in which a VAR model is used to predict the occurrence and length of an aperiodic backup time window on a storage system, it should be understood that other multivariate time series models may be created, for example using a recurrent neural network model such as a long short-term memory network model, depending on the implementation.

FIG. 5 is a functional block diagram of an example Vector Auto Regression (VAR) model (order p=1), according to some embodiments. A VAR model is a stochastic process, that represents a group of time-dependent variables as a linear function of their own past values and the past values of all the other variables in the group. For instance, it is possible to consider a multivariate time series analysis that describes a relationship between hourly fabric utilization, disk utilization, and CPU utilization and as a function of past values, in which the VAR model describing these time-dependent variables can be written as shown in FIG. 5.

The VAR model 210 shown in FIG. 5 models the utilization of the fabric at time t, as a combination of a constant a1, a first weight value w11 times the fabric utilization at time t−1, a second weight value w12 times the disk utilization at time t−1, a third weight value w13 times the CPU utilization at time t−1, and an error term e1 at time t−1. Similar equations are used to describe the predicted disk utilization and CPU utilization at time t based on the weight fabric, disk, and CPU utilization values at time t−1 and respective error terms. In the example VAR model shown in FIG. 5, a1, a2 and a3 are constants, w11, w12, w13, w21, w23, w31, w32 and w33 are coefficients that are learned values, and e1, e2 and e3 are the error terms.

A VAR model 210 may be created using weighted values from any number of previous time periods. The number of consecutive time periods that are used by the VAR model 210 is referred to as the "order" of the VAR model. FIG. 6 is a functional block diagram of an example Vector Auto Regression (VAR) model (order p=n), according to some embodiments. As shown in FIG. 6, a VAR model with an order n has weighted coefficients, which are learned values, which are multiplied by the values of the time-dependent variables at n previous time periods. Equation 2, shown below, is a special case of a VAR model in which the VAR model is order 3 (p=3):

(VAR model order $p = 3$): Equation 2

$$\text{Fabric}(t) = a1 + w11_1 * \text{Fabric}(t-1) +$$
$$w12_1 * \text{Disk}(t-1) + w13_1 * CPU(t-1) + e1_1(t-1) +$$
$$w11_2 * \text{Fabric}(t-2) + w12_2 * \text{Disk}(t-2) + w13_2 * CPU(t-2) + e1_2(t-2) +$$
$$w11_3 * \text{Fabric}(t-3) + w12_3 * \text{Disk}(t-3) + w13_3 * CPU(t-3) + e1_3(t-3)$$
$$\text{Disk}(t) = a2 + w21_1 * \text{Fabric}(t-1) +$$
$$w22_1 * \text{Disk}(t-1) + w23_1 * CPU(t-1) + e2_1(t-1) +$$
$$w21_2 * \text{Fabric}(t-2) + w22_2 * \text{Disk}(t-2) + w23_2 * CPU(t-2) + e2_2(t-1) +$$
$$w21_3 * \text{Fabric}(t-3) + w22_3 * \text{Disk}(t-3) + w23_3 * CPU(t-3) + e2_3(t-3)$$
$$CPU(t) = a3 + w31_1 * \text{Fabric}(t-1) +$$
$$w32_1 * \text{Disk}(t-1) + w33_1 * CPU(t-1) + e3_1(t-1) +$$

-continued
$$w31_2 * \text{Fabric}(t-2) + w32_2 * \text{Disk}(t-2) + w33_2 * CPU(t-2) + e3_2(t-2) +$$
$$w31_3 * \text{Fabric}(t-3) + w32_3 * \text{Disk}(t-3) + w33_3 * CPU(t-3) + e3_3(t-3)$$

In equation 2, the "a" values are constants, the "w" values are coefficients that are learned values, and the "e" values are the error terms. By adjusting the constants (a values), coefficients (w values) and errors (e values), the VAR model can be trained to generate a predicted fabric utilization during the current time period (Fabric(t)) a predicted disk utilization during the current time period (Disk(t)) and a predicted CPU utilization during the current time period (CPU(t)) based on the fabric, disc, and CPU utilization values during the preceding time periods (t−1, t−2, and t−3). Accordingly, it should be noted that in equation 2, the most recent time period that just occurred is denoted using the nomenclature (t−1) and the current time period, which has not yet occurred and which is being predicted by the VAR model, is denoted using the nomenclature (t). Thus, a trained VAR model enables the workload prediction engine 160 to predict the current resource utilization values during the upcoming time period, based on the resource utilization values during the preceding set of monitored time periods. Where the workload prediction engine 160 predicts that the upcoming time period will have low fabric, disk, and CPU utilization values, the upcoming time period is part of an aperiodic time window which can be exploited to implement backup operations on the storage system.

The basis behind VAR is that each of the time series in the system influences each other. That is, it is possible to predict the series with past values of itself along with other series in the system. Using Granger's Causality Test, it's possible to test this relationship before even building the model. For example, Table I, shown below, the row is the response (Y) and the columns are the predictor series (X). For example, looking at the value 0.0466 in (row 1, column 2), this value refers to the p-value of disk_x causing fabric_y. Whereas, the 0.03 in (row 1, column 3) refers to the p-value of fabric_y causing cpu_x.

TABLE I

|  | Fabric_X | Disk_X | CPU_X |
| --- | --- | --- | --- |
| Fabric_Y | 1.00 | 0.0466 | 0.03 |
| Disk_Y | 0.05 | 1.00 | 0.02 |
| CPU_Y | 0.04 | 0.06 | 1.0 |

In the above results, the row is the response (Y) and the columns are the predictor series (X). So, to interpret the p-values—if a given p-value is less than a significance level such as (0.05), then, the corresponding X series (column) causes the Y (row). It is thus possible to reject the null hypothesis and conclude, for example, that disk_X causes fabric_Y. Looking at the P-Values in the above table, it is possible to observe that all the variables (time series) in the system are interchangeably causing each other. This makes this system of multi time series a good candidate for using VAR models to forecast.

The manner in which the interdependencies between fabric utilization, disk utilization, and CPU utilization will vary from storage system to storage system. Specifically, differently configured storage systems are likely to have different numbers of fabrics, disks, and CPUs, and would be expected to be exposed to different types of workloads. Accordingly, in some embodiments a VAR model is uniquely trained on each storage system where the VAR model is to be used to predict aperiodic backup time windows. This allows a unique VAR model to be created for each specific storage system, to enable the VAR model to learn the interdependencies between fabric utilization, disk utilization, CPU utilization, on that storage system.

A unique VAR model may be trained for each storage system by starting with all weights of the VAR being equal, and then allowing the VAR model to adjust over time by changing the weights to cause the predicted output of the VAR model to match actual traffic characteristics of the storage system. This enables the VAR model to learn the interdependencies between fabric utilization, disk utilization, and CPU utilization on that storage system. Alternatively, rather than starting with all weights being equal, in some embodiments a VAR model that was trained on another storage system may be deployed to the storage system where it is to be used, and then the pre-trained VAR model from the other storage system may be adjusted based on time series data from the storage system where it is to be used. Thus, rather than starting with a VAR model where all the weights are equal, and allowing the VAR model to adjust over time to learn the interdependencies between fabric utilization, disk utilization, and CPU utilization on that storage system, a pre-trained model with example weights that were learned from another storage system may be used. By using a pre-trained VAR model and adjusting the pre-trained model for the particular storage system, it may be possible to accelerate conversion of the VAR model to reduce the amount of time required to train the VAR model to adjust the weights of the VAR model to enable the VAR model to predict aperiodic backup time windows on the particular storage system.

One way to select a VAR with an appropriate order p, is to obtain a normalized time-series of storage system utilization data, create VAR models with different orders, and use a model selection process such as Akaike Information Criterion (AIC) to select one of the models. AIC estimates the quality of each model, relative to each of the other models. The less information a model loses, the higher the quality of the model, and the more closely fit the model will be to the data being modeled. In connection with estimating the amount of information lost by a given model, AIC also looks at the trade-off between the goodness of fit of the model and the simplicity of the model. An example normalized time-series of storage system utilization was obtained, a series of VAR models were created, and AIC was used to select an order (p) of VAR based on the best AIC score. specifically, a grid-search was performed to investigate the optimal order (p) for the example normalized time series storage system utilization data. Our results show that the order of 3 (number of observations from the past data) should be sufficient to forecast future values of fabric utilization, disk utilization, and CPU utilization based on the time variant characteristics of the dataset. However, other storage systems and storage system workload patterns may require VAR models with different orders. Further, in some embodiments the particular order VAR is a customer configurable hyperparameter.

In some embodiments, if a VAR of a particular order is not deemed to be sufficiently accurate, part of the retraining of the VAR may be to adjust the VAR model to change the order of the VAR that is used by the workload prediction engine 160 to predict the occurrence of aperiodic backup time windows. For example, if a given workload prediction engine 160 is using a VAR order p=2, and the VAR is constantly being retrained, the workload prediction engine 160 may change the VAR model to be order p=3, and then retrain the newly configured VAR model. Although the order p=3 VAR model might be more complicated, and take longer to train initially, the higher order VAR might lose less information than the lower order VAR, thus exhibiting enhanced accuracy.

As shown in FIG. 7, in some embodiments a method of training a VAR model 210 includes creating training examples for VAR model 210 (blocks 700-710), and using the training examples to adjust the constants (a terms), coefficients (w terms), and error (e terms) of the VAR model 210 to enable the VAR model 210 to be tuned to be able to predict future fabric utilization, disk utilization, and CPU utilization levels of a given storage system. In some embodiments, training examples for the VAR model 210 are created by obtaining fabric utilization, disk utilization, and CPU utilization values from a most recent time period and from p−1 previous time periods (where p=order of the VAR mode) (block 700). The determined utilization values are then normalized (block 705).

A prediction is obtained from the current VAR model 210, based on the normalized utilization values from the most recent time period and the p−1 previous time periods. The prediction, in this instance, includes a predicted fabric utilization value, a predicted disk utilization value, and a predicted CPU utilization value for the current time period (block 710). At the end of the current time period, the predicted fabric, disk, and CPU utilization values are compared with the normalized actual fabric, disk, and CPU utilization values (block 715). A determination is then made if the current VAR model is sufficiently accurate (block 720). For example, if the predicted fabric, disk, and CPU utilization values are not sufficiently similar to the actual fabric, disk, and CPU utilization values (a determination of NO at block 720), the VAR model is adjusted for example by adjusting one or more of the constants (a terms), adjusting one of the coefficients (w terms), and/or by adjusting one of the error (e terms) (block 725).

This process (blocks 700-725) iterates for multiple time periods, until the VAR model is determined to be sufficiently accurate. Many ways of adjusting the constants (a terms), coefficients (w terms), and/or error (e terms) in block 725 may be used to optimize training of the VAR model, depending on the implementation. In some embodiments, each entry of the normalized storage system resource utilization data structure 400 forms a training example that is used to train a VAR model for the storage system that generated the fabric, disk, and CPU utilization values reflected in the normalized storage system resource utilization data structure 400.

In some embodiments, entries of the normalized storage system resource utilization data structure 400 are created by monitoring the utilization values of the storage system resources over a plurality of time periods. For example, the utilization values of the storage system may be monitored for several weeks, to create a large number of entries in the normalized storage system resource utilization data structure 400.

Once the entries in the normalized storage system resource utilization data structure 400 have been created, a VAR model is then trained by iteratively applying the fabric, disk, and CPU utilization values for a set of p consecutive entries, and using the VAR model to predict the p+1 entry of the normalized storage system resource utilization data structure 400. For example, in a VAR model where p=3, entries 1, 2, and 3, can be applied to the VAR model, to cause the VAR model to provide predicted utilization values of entry 4. If the output of the VAR model doesn't match the utilization values of entry 4, the parameters of the VAR model can be adjusted. Then, entries 2, 3, and 4 from the data structure 400 can be applied to the VAR model to cause the VAR model to provide predicted utilization values of entry 5. If the output of the VAR model doesn't match the utilization values of entry 5, the parameters of the VAR model can be adjusted. By serially providing the VAR model with the fabric, disk, and CPU utilization values sets of p entries, and adjusting the coefficients of the VAR model (block 725), it is possible to train the VAR model to enable the predicted output of the VAR model to converge to match the actual determined fabric, disk, and CPU utilization values reflected by the subsequent entries of the normalized storage system resource utilization data structure 400.

Once the VAR model has been determined to be sufficiently accurate (a determination of YES at block 720), the VAR model is deployed to the storage system that was used to generate the training data (block 730). The deployed trained VAR model is then used to predict the occurrence of aperiodic backup windows on the storage system, that can be exploited and used to run backup operations. As used herein, the term "aperiodic backup window" is used to refer to a time period where the output of the deployed trained VAR model predicts that the fabric utilization, disk utilization, and CPU utilization will all be below respective thresholds, or that the average of the predicted fabric utilization, disk utilization, and CPU utilization will be below a particular average threshold.

Figure 8:
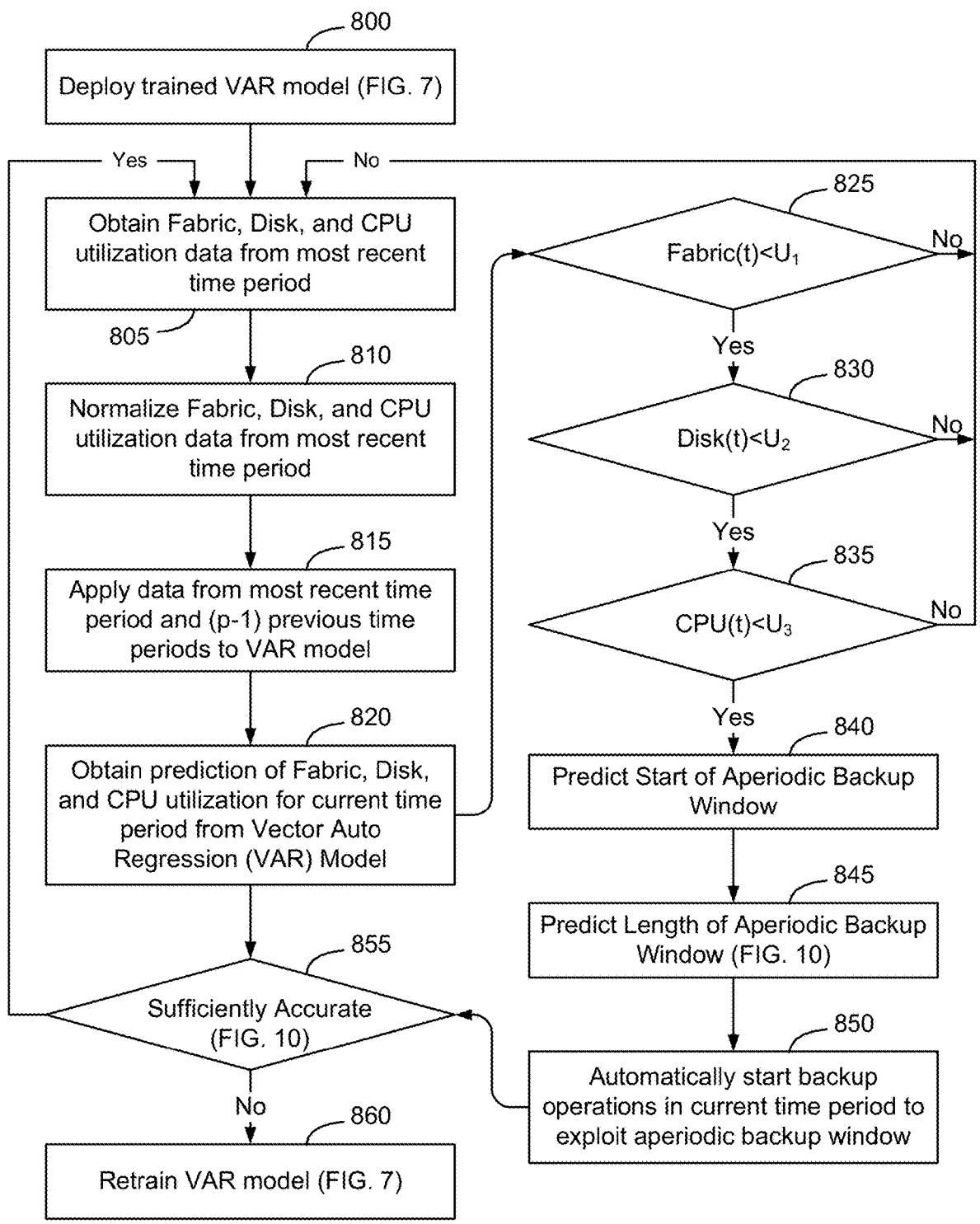
FIG. 8 is a flow chart of a process of using a trained VAR model to predict an aperiodic backup time window and exploit the aperiodic backup time window to implement backup operations, according to some embodiments.

FIG. 8 is a flow chart of a process of using a trained VAR model to predict occurrence of an aperiodic backup time window and to exploit the aperiodic backup time window to implement backup operations, according to some embodiments. As shown in FIG. 8, in some embodiments when the trained VAR model is deployed (block 800), the trained VAR model is used to predict the start of an aperiodic backup window (block 840) and the length of the aperiodic backup window (block 845). Specifically, given the current CPU utilization, disk utilization, and fabric utilization values, the trained VAR model will provide, as output, a predicted fabric utilization, disk utilization, and CPU utilization values for a subsequent time period (t).

As shown in FIG. 8, fabric utilization, disk utilization, and CPU utilization values are obtained from the current time period (block 805). These values are normalized (block 810) and entered into the trained deployed VAR model (block 815). The VAR model is then used to provide a prediction of fabric utilization, disk utilization, and CPU utilization values for one or more subsequent time periods (block 820).

The predicted fabric utilization, disk utilization, and CPU utilization values are then compared with respective thresholds to predict occurrence of an aperiodic backup time window. For example, as shown in FIG. 8, the predicted fabric utilization in the upcoming time window (Fabric(t)) is compared with a first threshold $U_1$ (block 825), the predicted disk utilization in the upcoming time window (Disk(t)) is compared with a second threshold $U_2$ (block 830), and the predicted CPU utilization in the upcoming time window (CPU(t)) is compared with a third threshold $U_3$. If all three conditions are met (a determination of YES at blocks 825, 830, and 835), the workload prediction engine 160 predicts the start of an aperiodic backup time window (block 840). Optionally, as shown in FIG. 8, in some embodiments the workload prediction engine 160 is configured to automatically exploit the predicted aperiodic backup time window by causing backup operations to occur during the current time period (block 850).

If any of these three conditions are not met (a determination of NO at blocks 825, 830, or 835), the workload prediction engine 160 does not predict that the next subsequent time period will be the start of an aperiodic backup time window and the process returns to monitoring storage resource utilization values (block 805).

Although some embodiments have been described in connection with FIG. 8 where the predicted utilization values (Fabric(t), Disk(t) and CPU(t)), are compared with respective individual thresholds $U_1$, $U_2$, and $U_3$, alternatively an average utilization value AVG(t) may be computed, where AVG(t)=(Fabric(t)+Disk(t)+CPU(t))/3. This average utilization, AVG(t), may then be compared with a single threshold UA, and if the average utilization is below the threshold UA, the workload prediction engine 160 predicts the start of an aperiodic backup time window.

There are conditions that might make it desirable to periodically retrain the VAR model to enable the VAR model to more accurately predict resource utilization values based on previous resource utilization values. For example, traffic characteristics on the storage system can change over time. Accordingly, in some embodiments, the predictions of the VAR model are analyzed to determine if the predicted fabric utilization, disk utilization, and CPU utilization values are sufficiently accurate (block 855). If the VAR model is deemed to no longer be sufficiently accurate (a determination of NO at block 855) the VAR model is retrained (block 860). Otherwise, the process returns to block 805 where the VAR model continues to be used in a predictive manner to predict CPU, fabric, and disk utilization values of the storage system.

Figure 9:
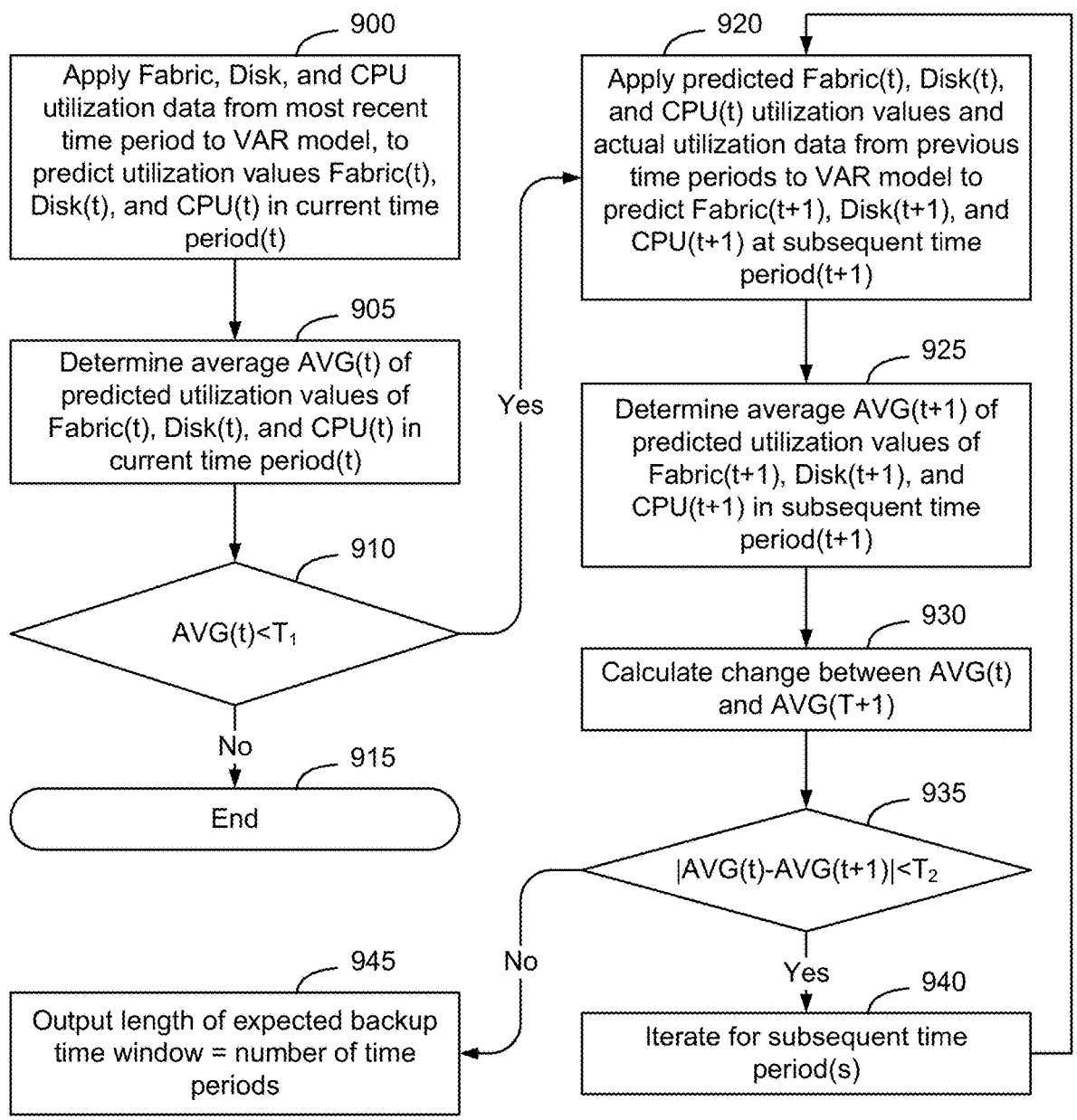
FIG. 9 is a flow chart of a process of using a trained VAR model to predict a length of an aperiodic backup time window, according to some embodiments.

It should be noted that, in some embodiments, the VAR model is continuously trained, even while deployed, using the process shown in FIG. 7. Specifically, it is possible to continue adjusting the coefficients of the VAR model (block 725) as new fabric, disk, and CPU utilization values are obtained (FIG. 8, block 805), to thus continuously refine the accuracy of the VAR model FIG. 9 is a flow chart of a process of using a trained VAR model to predict a length of an aperiodic backup time window, according to some embodiments. As discussed above, a VAR model that has been trained using fabric utilization, disk utilization, and CPU utilization values of a storage system, will learn the interdependencies between these utilization values and can be used to predict the fabric utilization, disk utilization, and CPU utilization values of a storage system during a current (upcoming) time period. Where the current time period is predicted to be an aperiodic backup time window, in which the utilization values of all three of these system resources are predicted to be low, it would be advantageous to be able to determine how long the aperiodic backup time window is likely to last.

FIG. 10 is a functional block diagram showing use of a VAR model in an iterative manner to predict utilization values of multiple upcoming time periods, according to some embodiments. As shown in FIG. 10, in some embodiments, the trained VAR model may be used in a forward-looking manner by using the predicted values of the VAR model and using those predicted values to predict the fabric utilization, disk utilization, and CPU utilization values of the storage system in subsequent time period(s). FIG. 10 shows an example of how an order p=3 VAR model may be used to predict resource utilization values the current upcoming time period and two subsequent time periods. For clarity, FIG. 10 only shows the fabric portion of the VAR model—the same process can be used with the other most recent portions of the VAR model to predict the data utilization and CPU utilization for subsequent time periods.

As shown in FIG. 10, initially the most recent (time=t−1) utilization values of fabric, disk, and CPU utilization are applied to the VAR model as well as the actual utilization values form the preceding two time periods (time=t−2, and time=t−3) to obtain predicted fabric utilization values for the upcoming current time period (time=t). These predicted values may similarly be applied to the VAR model to obtain predicted utilization values for subsequent time periods. By iterating over time, and applying the predicted utilization values to the VAR model to obtain subsequent predicted utilization values, it is possible to predict the utilization values of the fabric, disk, and CPU over time to look for time periods where all three utilization values are predicted to be low. Similarly, once an aperiodic time period is determined, iteratively applying the predicted values to the VAR model enables the workload prediction engine 160 to obtain an estimate of the length of the aperiodic backup window.

The process shown in FIG. 10 can be used, in some embodiments, to determine a length of an aperiodic backup time window, once the start of an aperiodic time window has been detected. For example, as shown in FIG. 9, in some embodiments the observed current fabric utilization, disk utilization, and CPU utilization values from the most recent time period are applied to the VAR model 210, along with the actual utilization values for the p−1 previous time periods, and the VAR model provides as output predicted utilization values for the upcoming time period (time=t) (block 900). Specifically, the VAR model provides, as output, the predicted fabric utilization Fabric(t), the predicted disk utilization Disk(t), and the predicted CPU utilization CPU(t), for the upcoming current time period.

In some embodiments, the workload prediction engine 160 determines an average workload AVG(t) for the upcoming current time period (time=t) based on the predicted utilization values Fabric(t), Disk(t), and CPU(t), (block 905). In some embodiments AVG(t)=(Fabric(t)+Disk(t)+CPU(t))/3. The average predicted utilization value AVG(t) is then compared with a first threshold $T_1$. If the average predicted utilization value AVG(t) is not less than a first threshold $T_1$ (a determination of NO at block 910) an aperiodic backup time window is not likely to be starting (block 915).

If the average predicted utilization value AVG(t) is less than a first threshold $T_1$ or is less than or equal to the first threshold $T_1$ (a determination of YES at block 910) in some embodiments the workload prediction engine 160 predicts the start of an aperiodic backup time window and the workload prediction engine 160 uses the VAR model to predict a length of the aperiodic backup time window. For example, as shown in FIG. 9, in some embodiments the predicted utilization values that the VAR predicted for the current time period (Fabric(t), Disk(t), and CPU(t),) and the actual utilization values from the preceding p−1 time periods are applied to the VAR model 210, to cause the VAR model 210 to predict the utilization values (Fabric(t+1), Disk(t+1), and CPU(t+1)) for the next subsequent time period (time=t+1) (block 920).

The workload prediction engine 160 then determines the average AVG(t+1) of the predicted utilization values for the subsequent time period (block 925). In some embodiments, AVG(t+1)=(Fabric(t+1)+Disk(t+1)+CPU(t+1))/3. The workload prediction engine 160 calculates the change between the average utilization value AVG(t) for the current time period and the average utilization value AVG(t+1) for the subsequent time period (block 930). For example, in some embodiments the workload prediction engine 160 determines the absolute value of the change between average utilization value AVG(t) for the current time period and the average utilization value AVG(t+1), and compares the amount the average utilization is predicted to change with a second threshold $T_2$ (block 935). If the average utilization is not predicted to change significantly such that the difference in utilization values is lower than threshold $T_2$ (a determination of YES at block 935), the process iterates for subsequent time period(s) (block 940).

If the average utilization is predicted to change more than the threshold amount $T_2$ (a determination of NO at block 935), the change in utilization is interpreted as an end of the aperiodic backup time window. The workload prediction engine 160 provides, as output, a length of the predicted backup time window based on the number of time periods where the average utilization values didn't change significantly, when compared with the utilization value that was interpreted as causing the start of the aperiodic backup time window (block 945). For example, if the process iterated 4 times, and each time period is 5 minutes, the workload prediction would predict the length of the identified aperiodic backup time window as being predicted to be 20 minutes long.

Figure 11:
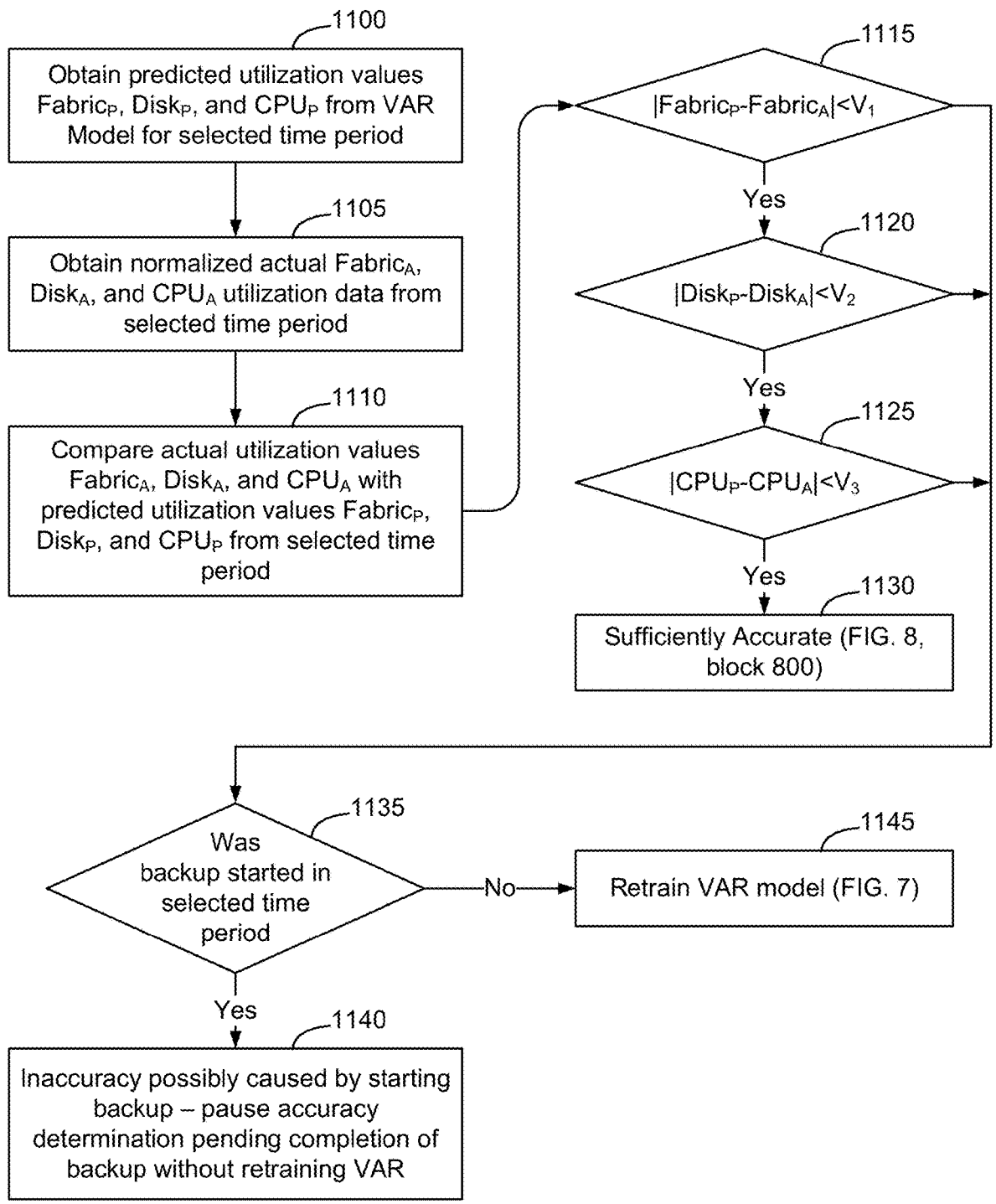
FIG. 11 is a flow chart of a process of evaluating continued accuracy of a deployed trained VAR model, according to some embodiments.

FIG. 11 is a flow chart of a process of evaluating continued accuracy of a deployed trained VAR model, according to some embodiments. As shown in FIG. 11, in some embodiments the workload prediction engine 160 uses predicted values from the VAR for a set of time periods and compares the predicted values against the actual values to determine if the trained VAR is sufficiently accurate, or if the VAR should possibly be retrained. For example, in some embodiments the workload prediction engine 160 obtains predicted utilization values for fabric utilization (Fabric$_P$), disk utilization (Disk$_P$), and CPU utilization (CPU$_P$) for a selected previous time period (block 1100). The workload prediction engine 160 also obtains normalized actual fabric utilization (Fabric$_A$), and disk utilization (Disk$_A$), and CPU utilization (CPU$_A$) for the selected previous time period (block 1105). The selected previous time period may be any previous time period, although in some embodiments the selected previous time period is the most recent (current) time period, and the comparison between predicted utilization values and actual utilization values is implemented at the end of the current time period.

The workload prediction engine 160 compares the actual fabric utilization (Fabric$_A$), disk utilization (Disk$_A$), and CPU utilization (CPU$_A$) with the predicted fabric utilization (Fabric$_P$), disk utilization (Disk$_P$), and CPU utilization (CPU$_P$) that were predicted by the VAR model 210 for the selected time period (block 1110). For example, in some embodiments, the workload prediction engine 160 compares the absolute value of the difference between the predicted fabric utilization (Fabric$_P$) and actual fabric utilization (Fabric$_A$) with a first variance threshold $V_1$ (block 1120). The workload prediction engine 160 compares the absolute value of the difference between the predicted disk utilization (Disk$_P$) and actual disk utilization (Disk$_A$) with a second variance threshold $V_2$ (block 1125). The workload prediction engine 160 also compares the absolute value of the difference between the CPU utilization (CPU$_P$) and actual CPU utilization (CPU$_A$) with a third variance threshold $V_3$ (block 1115). If the variances between the predicted values and the actual values are lower than the variance thresholds (a determination of YES in all of blocks 1115, 1120, and 1125) the currently trained VAR model is sufficiently accurate (block 1130).

If one or more of the variances between the predicted values and the actual values are higher than the respective variance thresholds (a determination of No in any one of blocks 1115, 1120, or 1125), it is possible that the VAR model may need to be trained.

As noted above, in connection with FIG. 8, block 850, in some embodiments where the VAR predicts the start of an aperiodic backup window (block 840), the workload prediction engine 160 automatically exploits the aperiodic backup window in block 850 by starting backup operations on the storage system. Backup operations can consume large quantities of system resources. Comparing the predicted values of the VAR against actual utilization values during a predicted aperiodic backup time period that was exploited to implement backup operations on the storage system could cause the VAR to appear to be improperly trained.

For example, assume that the trained VAR predicts the following utilization values for the current time period(t): $Fabric_P(t)=0.01$, $Disk_P(t)=0.01$, and $CPU_P(t)=0.01$. Based on these values, the workload prediction engine 160 determines that the current time period qualifies as an aperiodic backup time window, and immediately starts backup operations during the time window. The backup operations consume huge amounts of resources on the storage system such that, at the end of the current time period, the actual utilization values for the current time period(t): $Fabric_A(t)=0.95$, $Disk_A(t)=0.85$, and $CPU_A(t)=0.45$. Using the process shown in FIG. 11, the discrepancy between actual utilization and predicted utilization will appear to be quite large. However, the discrepancy is not due to a training problem with the VAR model, but rather is due to the fact that an additional workload (backup workload) was added to the storage system in response to detection by the VAR of the occurrence of an aperiodic backup time window.

Accordingly, in some embodiments, as shown in FIG. 11, the workload prediction engine 160 checks to determine if the workload prediction engine 160 started backup operations during the selected time period (block 1135). If backup operations were started during the selected time period (a determination of YES at block 1135), the inaccuracy was possibly caused by starting backup operations on the storage system. Accordingly, in some embodiments the determination of VAR model inaccuracy may be ignored (block 1140) such that the VAR model is not subject to retraining based on the detected discrepancies between predicted resource utilization and actual resource utilization during the selected time period. If backup operations were not started during the selected time period (a determination of NO at block 1135) the discrepancies between predicted and actual utilization values might require the VAR model to be retrained (block 1145).

Figure 12:
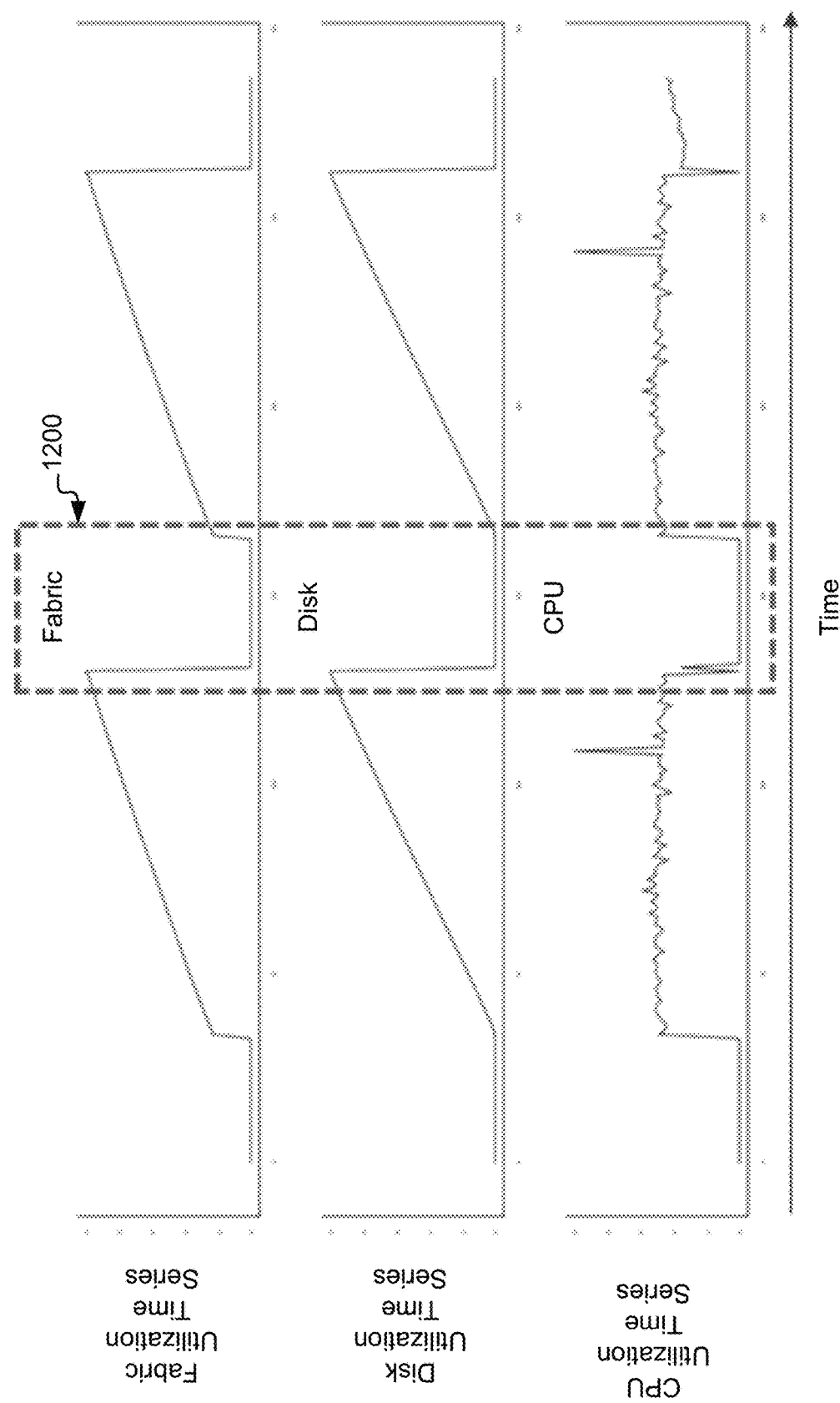
FIG. 12 is a graph of example fabric utilization, disk utilization, and CPU utilization over time, according to some embodiments.

FIG. 12 is a graph of example fabric utilization, disk utilization, and CPU utilization over time, according to some embodiments. As shown in FIG. 12, in some embodiments the workload prediction engine 160 monitors the fabric utilization time series, disk utilization time series, and CPU utilization time series, and uses these time series values to train a VAR model to enable the VAR model to predict a time period when the workload is predicted to be low across all of the storage system resources (fabric, disk, and CPU). The time period encircled by the dashed box 1200, in FIG. 12, is one such time period. This period of low activity on the storage system may be exploited by the workload prediction engine 160 and used to perform backup operations on the storage system, to prevent the backup operations from interfering with primary workload or storage system background tasks that are performed by the systems applications of the storage system itself.

Figure 13:
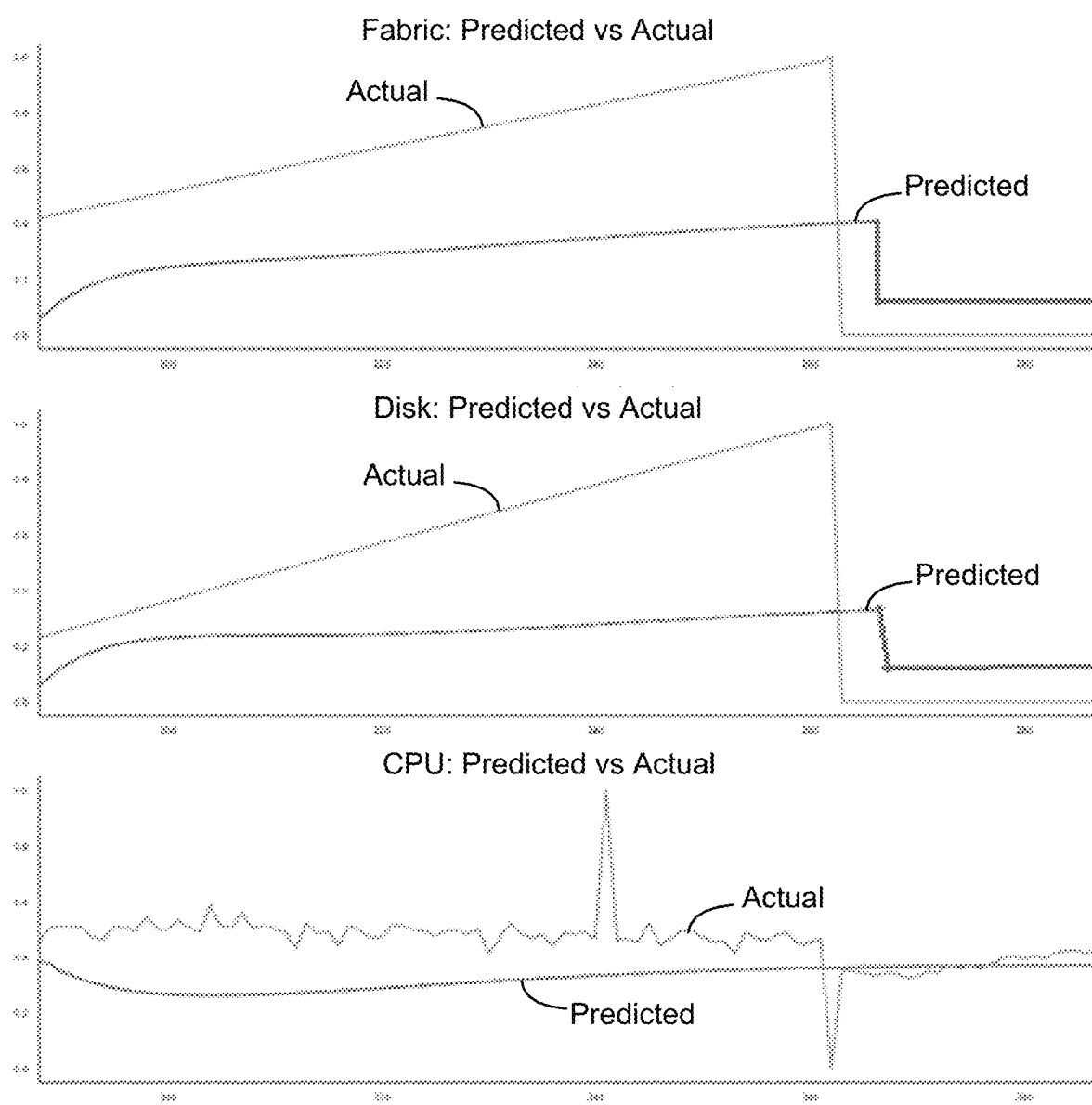
FIG. 13 is a graph comparing example forecast fabric utilization, forecast disk utilization, and forecast CPU utilization with example actual fabric utilization, actual disk utilization, and actual CPU utilization over an example set of time periods, according to some embodiments.

FIG. 13 is a graph comparing example forecast fabric utilization, forecast disk utilization, and forecast CPU utilization with example actual fabric utilization, actual disk utilization, and actual CPU utilization over an example set of time periods, according to some embodiments. As shown in FIG. 13, a VAR model was created and used to predict utilization values of fabric, disk, and CPU resources of a storage system. The actual utilization values and the predicted utilization values are shown in FIG. 13. As shown in FIG. 13, the predicted (forecast) utilization values closely tracked the actual utilization values for fabric utilization (top graph), disk utilization (middle graph), and CPU utilization (bottom graph).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for predicting and exploiting aperiodic backup time windows on a storage system, the computer program including a set of instructions which, when executed by a computer, cause the computer to perform a method comprising the steps of:

obtaining fabric utilization, disk utilization, and CPU utilization values of a storage system for a set of consecutive time intervals, the fabric utilization value being a total amount of fabric bandwidth consumed on all fabrics of the storage system, the disk utilization being a total amount of disk bandwidth consumed on all disks of the storage system, and the CPU utilization value being a total amount of CPU cycles consumed by all threads on all CPUs of the storage system;
normalizing the fabric utilization, disk utilization, and CPU utilization values for each consecutive time interval; and
using the normalized fabric utilization, disk utilization, and CPU utilization values to train a multivariate time series model to learn time variant interdependencies between fabric utilization, disk utilization, and CPU utilization of the storage system.

2. The non-transitory tangible computer readable storage medium of claim 1, wherein the multivariate time series model is a Vector Auto Regression (VAR) model.

3. The non-transitory tangible computer readable storage medium of claim 2, wherein the VAR model is of order p, in which the VAR model is trained to predict normalized fabric utilization, disk utilization, and CPU utilization values for an upcoming current time period based on the normalized fabric utilization, disk utilization, and CPU utilization values from the preceding p time periods.

4. The non-transitory tangible computer readable storage medium of claim 3, further comprising deploying the VAR model on the storage system, monitoring fabric utilization, disk utilization, and CPU utilization values of the storage system during an immediately preceding time interval;
normalizing the fabric utilization, disk utilization, and CPU utilization values for the immediately preceding time interval;
applying the normalized fabric utilization, disk utilization, and CPU utilization values for the immediately preceding time interval to the deployed VAR model;
outputting predicted fabric utilization, disk utilization, and CPU utilization values for a current upcoming time interval by the VAR model;
comparing the predicted fabric utilization, disk utilization, and CPU utilization values with one or more thresholds; and
determining, from the step of comparing, that the current upcoming time interval is an aperiodic backup time window where the fabric utilization, disk utilization, and CPU utilization values are below the one or more thresholds.

5. The non-transitory tangible computer readable storage medium of claim 4, further comprising exploiting the aperiodic backup time window by causing backup operations to commence in the current upcoming time interval.

6. The non-transitory tangible computer readable storage medium of claim 4, further comprising applying the predicted fabric utilization, disk utilization, and CPU utilization values from the current upcoming time interval to the VAR model to obtain predicted fabric utilization, disk utilization, and CPU utilization values from the VAR model for a time period subsequent to the current upcoming time interval.

7. A system, comprising:
at least one processor and at least one memory configured to implement a deployed Vector Auto Regression (VAR) model, the deployed VAR model being trained using features extracted from a time-series set of measured storage system fabric utilization, disk utilization, and CPU utilization values, the at least one processor configured to at least:
automatically predict a start of an aperiodic backup time window, using the deployed VAR model, the predicted aperiodic backup time window being a subsequent time period where the deployed VAR model predicts utilization rates of each of the interdependent fabric utilization, disk utilization, and CPU utilization values is below a first hyper parameter; and
automatically exploit the aperiodic backup time window by scheduling backup operations to commence at the start of the aperiodic backup time window.

8. The system of claim 7, wherein the time-series set of measured storage system fabric utilization, disk utilization, and CPU utilization values of a storage system are fabric utilization, disk utilization, and CPU utilization values measured over a set of consecutive time intervals, the fabric utilization value being a total amount of fabric bandwidth consumed on all fabrics of the storage system, the disk utilization being a total amount of disk bandwidth consumed on all disks of the storage system, and the CPU utilization value being a total amount of CPU cycles consumed by all threads on all CPUs of the storage system.

9. The system of claim 7, wherein the VAR model is of order p, in which the VAR model is trained to predict normalized fabric utilization, disk utilization, and CPU utilization values for an upcoming current time period based on the normalized fabric utilization, disk utilization, and CPU utilization values from the preceding p time periods.

10. The system of claim 7, wherein the at least one processor is configured to automatically predict the start of the aperiodic backup time window by:
monitoring fabric utilization, disk utilization, and CPU utilization values of the storage system during an immediately preceding time interval;
normalizing the fabric utilization, disk utilization, and CPU utilization values for the immediately preceding time interval;
applying the normalized fabric utilization, disk utilization, and CPU utilization values for the immediately preceding time interval to the deployed VAR model;
outputting predicted fabric utilization, disk utilization, and CPU utilization values for a current upcoming time interval from the VAR model;
comparing the predicted fabric utilization, disk utilization, and CPU utilization values with one or more thresholds; and
determining, from the step of comparing, that the current upcoming time interval is an aperiodic backup time window where the fabric utilization, disk utilization, and CPU utilization values are below the first hyper parameter.

11. The system of claim 7,
wherein the at least one processor is further configured to predict a length of the aperiodic backup time window by:
applying the predicted fabric utilization, disk utilization, and CPU utilization values from the current upcoming time interval to the VAR model to obtain predicted fabric utilization, disk utilization, and CPU utilization values from the VAR model for a subsequent time period.

12. A method of predicting and exploiting aperiodic backup time windows on a storage system comprising:
obtaining fabric utilization, disk utilization, and CPU utilization values of a storage system for a set of consecutive time intervals, the fabric utilization value being a total amount of fabric bandwidth consumed on all fabrics of the storage system, the disk utilization being a total amount of disk bandwidth consumed on all disks of the storage system, and the CPU utilization value being a total amount of CPU cycles consumed by all threads on all CPUs of the storage system;

normalizing the fabric utilization, disk utilization, and CPU utilization values for each consecutive time interval; and using the normalized fabric utilization, disk utilization, and CPU utilization values to train a multivariate time series model to learn time variant interdependencies between fabric utilization, disk utilization, and CPU utilization of the storage system.

13. The method of claim 12, wherein the multivariate time series model is a Vector Auto Regression (VAR) model.

14. The method of claim 13, wherein the VAR model is of order p, in which the VAR model is trained to predict normalized fabric utilization, disk utilization, and CPU utilization values for an upcoming current time period based on the normalized fabric utilization, disk utilization, and CPU utilization values from the preceding p time periods.

15. The method of claim 14, further comprising deploying the VAR model on the storage system, monitoring fabric utilization, disk utilization, and CPU utilization values of the storage system during an immediately preceding time interval;

normalizing the fabric utilization, disk utilization, and CPU utilization values for an immediately preceding time interval;

applying the normalized fabric utilization, disk utilization, and CPU utilization values for the immediately preceding time interval to the deployed VAR model;

outputting predicted fabric utilization, disk utilization, and CPU utilization values for a current upcoming time interval by the VAR model;

comparing the predicted fabric utilization, disk utilization, and CPU utilization values with one or more thresholds; and determining, from the step of comparing, that the current upcoming time interval is an aperiodic backup time window where the fabric utilization, disk utilization, and CPU utilization values are below the one or more thresholds.

16. The method of claim 15, further comprising exploiting the aperiodic backup time window by causing backup operations to commence in the current upcoming time interval.

17. The method of claim 15, further comprising applying the predicted fabric utilization, disk utilization, and CPU utilization values from the current upcoming time interval to the VAR model to obtain predicted fabric utilization, disk utilization, and CPU utilization values from the VAR model for a time period subsequent to the current upcoming time interval.

* * * * *